United States Patent [19]
Halstead et al.

[11] Patent Number: 5,341,978
[45] Date of Patent: Aug. 30, 1994

[54] BRAZE FURNACE WITH IMPROVED INERT GAS SYSTEM

[75] Inventors: Gary A. Halstead; Brian L. Barten, both of Lockport, N.Y.

[73] Assignee: General Motors Corporation, Detroit, Mich.

[21] Appl. No.: 106,897

[22] Filed: Aug. 16, 1993

[51] Int. Cl.⁵ .............................................. B23K 3/00
[52] U.S. Cl. ........................................ 228/42; 228/46; 432/77
[58] Field of Search ............... 228/183, 219, 220, 222, 228/42, 46; 432/77, 85, 233

[56] References Cited
U.S. PATENT DOCUMENTS

| | | | |
|---|---|---|---|
| 3,756,489 | 9/1973 | Chartet | 228/46 |
| 4,634,044 | 1/1987 | Hargrove et al. | 228/46 |
| 5,172,847 | 12/1992 | Barten et al. | 228/18 |
| 5,172,848 | 12/1992 | Barten et al. | 228/18 |
| 5,195,673 | 3/1993 | Irish et al. | 228/18 |

*Primary Examiner*—Samuel M. Heinrich
*Attorney, Agent, or Firm*—Patrick M. Griffin

[57] ABSTRACT

A braze furnace of the inert gas type cooperatively uses the waste heat from the cooling chamber to vaporize liquid inert gas, while using the coolness of the inert gas being vaporized to accelerate the cooling process itself. The walls of the cooling chamber provide a hollow plenum into which stored liquified inert gas is metered and vaporized. From the plenum, vaporized gas is routed wherever needed to purge oxygen from the system. In addition, liquid gas can be injected directly into the cooling chamber for even quicker, direct part cooling and the purge the cooling chamber.

3 Claims, 5 Drawing Sheets

BRAZE FURNACE WITH IMPROVED INERT GAS SYSTEM

This invention relates to braze furnaces in general, and specifically to a braze furnace with an improved system for providing an inert gas brazing environment.

BACKGROUND OF THE INVENTION

Aluminum heat exchangers are manufactured by a brazing method in which the mating aluminum parts, tubes, cooling fins, and the like, are coated with a braze material that melts and liquifies at a temperature lower than the melting point of the base aluminum. Wherever a small, controlled gap exists, as between a slot in a tank header plate and the end of a tube in the slot, melted braze material is drawn in by capillary action to create a braze seam that becomes rigid and leak free upon later cooling and solidification. To aid in the process, the workpiece is first flux coated, a layer that also melts when heated. Oxygen would chemically interfere with the braze process if it were present, so it is standard practice to provide a controlled inert gas environment within the braze furnace, which is usually nitrogen, since it is nontoxic and relatively easy to handle. However, nitrogen must be stored in a liquid form in bulk, and must be vaporized before it is used in the brazing process. Therefore, some apparatus must be provided to vaporize it. Typically, liquid nitrogen is run through a separate evaporator and preheater before it is ducted into the braze furnace. In addition, braze furnaces, such as that disclosed in U.S. Pat. No. 5,172,847 often contain a separate means, such as a water jacket, to actively cool the brazed workpiece before it is withdrawn back into the atmosphere.

SUMMARY OF THE INVENTION

The invention provides a braze furnace with a system that cooperatively provides both workpiece final cooling and inert gas vaporization. The final, cooling chamber has hollow walls that create a plenum into which liquid nitrogen can be directly metered. The heat emitted from the cooling workpieces heats the walls of the plenum, vaporizing the nitrogen which in turn cools the inner walls of the cooling chamber to help cool the workpieces. Both a vaporization means for the liquid nitrogen, and a cooling means for the final chamber, are eliminated. From the plenum, vaporized nitrogen is metered into the braze furnace continually to keep oxygen displaced. In addition, vaporized nitrogen can be selectively routed to an initial entrance chamber to purge it of outside air before workpieces are fed into the braze chamber. To further accelerate part cooling, liquid nitrogen can also be metered directly into the cooling chamber to actively cool workpieces, if desired, which also serves to keep the cooling chamber purged of oxygen.

DESCRIPTION OF THE PREFERRED EMBODIMENT

These and other features of the invention will appear from the following written description, and from the drawings, in which.

Figure 1:
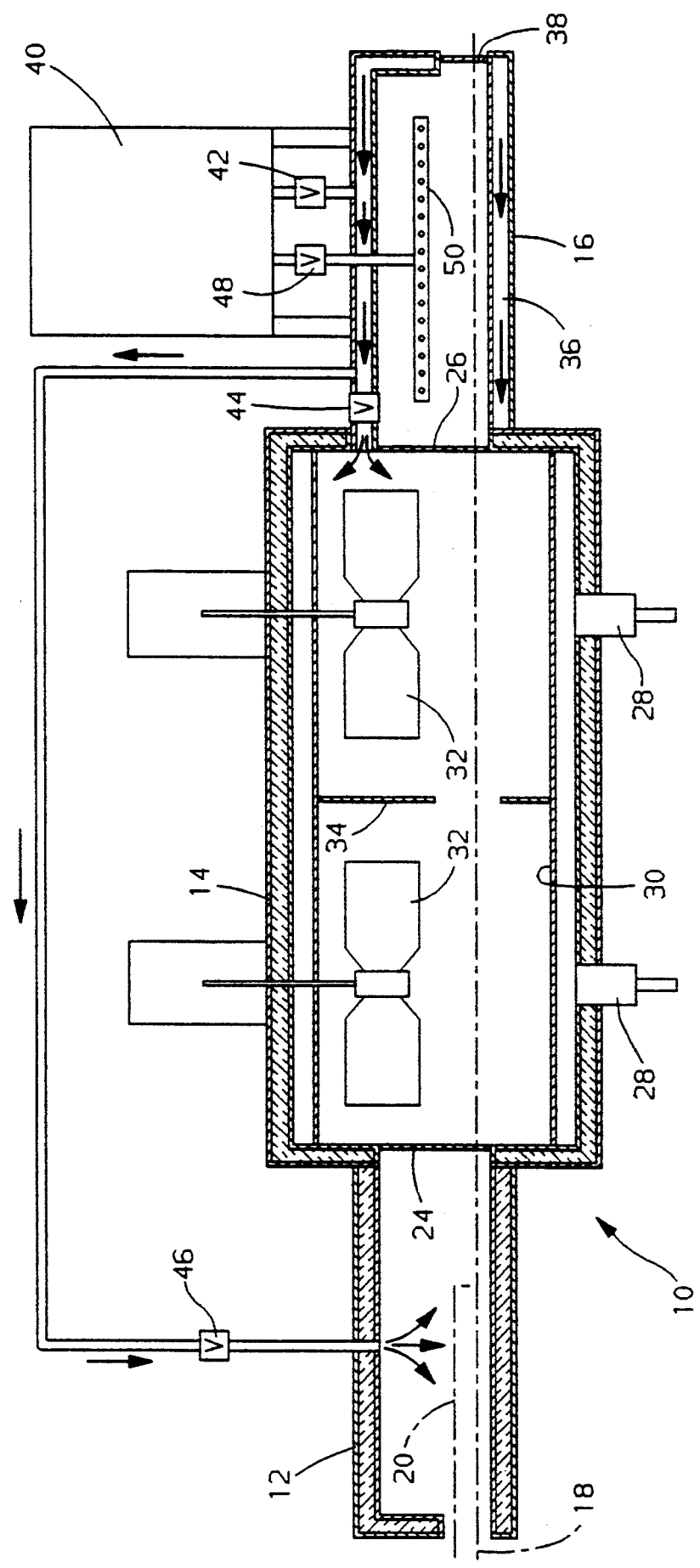
FIG. 1 is a schematic view of the invention at the stage where parts are just entering the first chamber of the furnace.

Referring first to FIG. 1, a schematic view of a braze furnace according to the invention, indicated generally at (10), shows many components in simple outline, but those skilled in the art will recognize them as being standard or typical for braze furnaces in general. An aligned series of chambers, including an initial entrance chamber (12), a two-zone braze chamber (14), and a final or cooling chamber (16), are all interconnected by a conveyor chain (18), which is represented just by a dotted line. Workpieces, such as aluminum radiators or condensers indicated by the short dotted line at (20), move successively through the chambers (12) through (16) on conveyor (18). The walls of the chambers (12) and (14) are insulated, and each is provided with inner and outer doors, indicated at (22,24,26) respectively, with door (24) shared between the two chambers. The doors (22–26) are each capable of closing off their respective chambers (12) or (14) completely from the outside atmosphere, or the other chamber, as the case may be. As a consequence, it will be understood that furnace (10) is the so-called indexing type in which batches of workpieces (20) travel through one batch at a time, rather than the continuous flow type of furnace in which parts flow through constantly without a complete seal from the outside. Braze furnace (10) is a muffle furnace, meaning that burners (28) heat the annular space created by a heat emitting inner sleeve (30). The gaseous environment inside the braze chamber (14), which is nitrogen as disclosed, is circulated in a closed loop within braze chamber (14) by impellers or fans (32). A baffle (34) divides braze chamber (14) into two subchambers or zones, which can be brought to successively higher temperatures to heat the workpieces (20) accordingly. Any number of such zones could be provided. The inert gas or nitrogen environment that is circulated within chamber (14) is provided as described next.

Still referring to FIG. 1, the cooling chamber (16) is hollow walled, rather than solidly filled with insulation, creating a cavity or plenum (36). An outer door (38) at the end of cooling chamber (16) provides the fourth of the four doors need to selectively close off the three chambers (12–16) from one another and from the outside. The inner wall of plenum (36) will be heated by emission from the heated workpieces (20) contained and cooling within it, when the two cooling chamber doors (26) and (38) are closed. This "free" source of heat is used in the invention by metering liquid nitrogen from a stored cryogenic source indicated as tank (40) through a first valve (42) into plenum (36), where it will be vaporized. Room temperature alone would be enough to vaporize nitrogen, as at initial startup, but braze processes are run almost continually, in general, and vaporization will occur quickly when plenum (36) is heated. Various other components allow the vaporized nitrogen so produced to be used in the brazing process in several ways described further below. A second valve (44) is used to continually meter some of the vaporized nitrogen gas into the braze chamber (14), so as to continually displace any oxygen contamination. A third valve (46) is used to selectively inject some of the vaporized nitrogen gas from plenum (36) to entrance chamber (12), for a purpose described below. In addition, in the embodiment disclosed, a fourth valve (48) can be used to selectively inject liquid nitrogen directly from source (40) into cooling chamber (16) through a manifold pipe (50).

Figure 2:
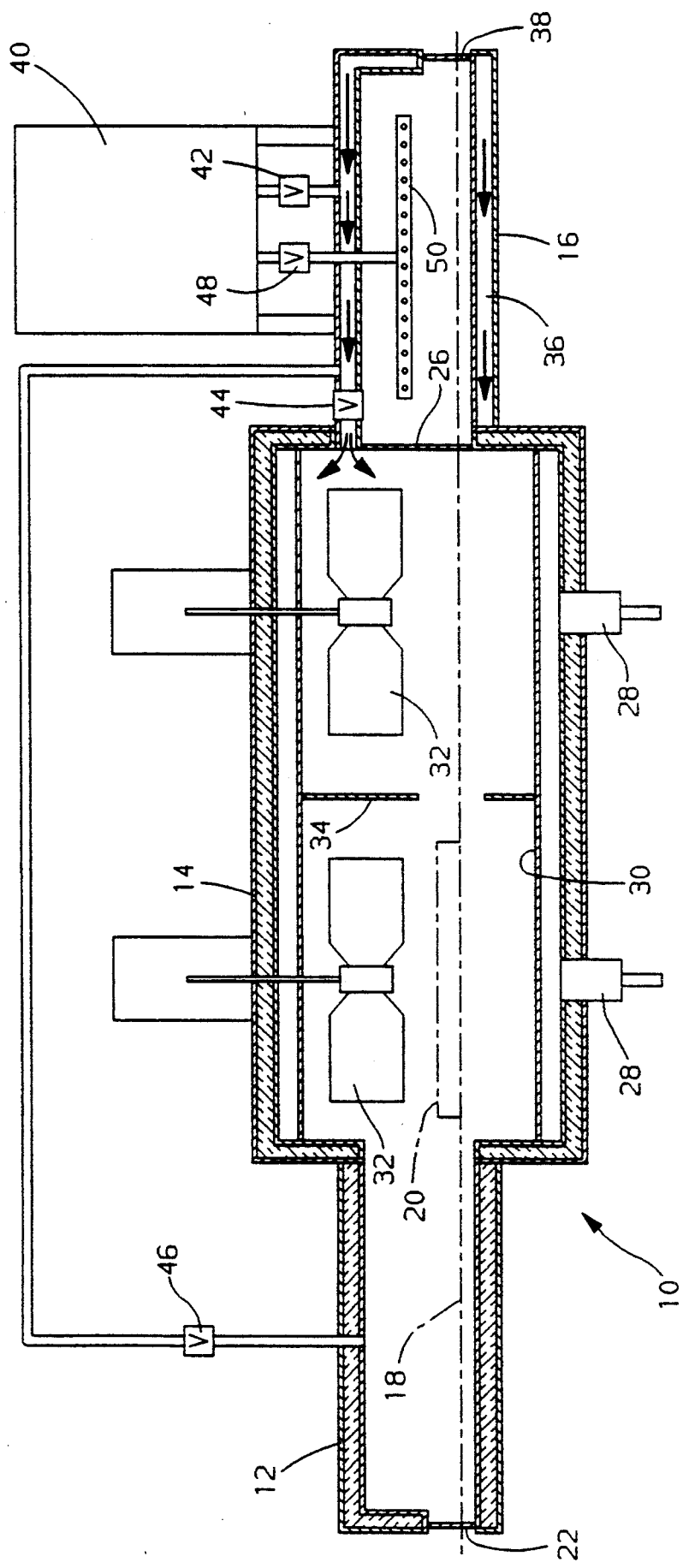
FIG. 2 shows the parts in the braze chamber.
Figure 3:
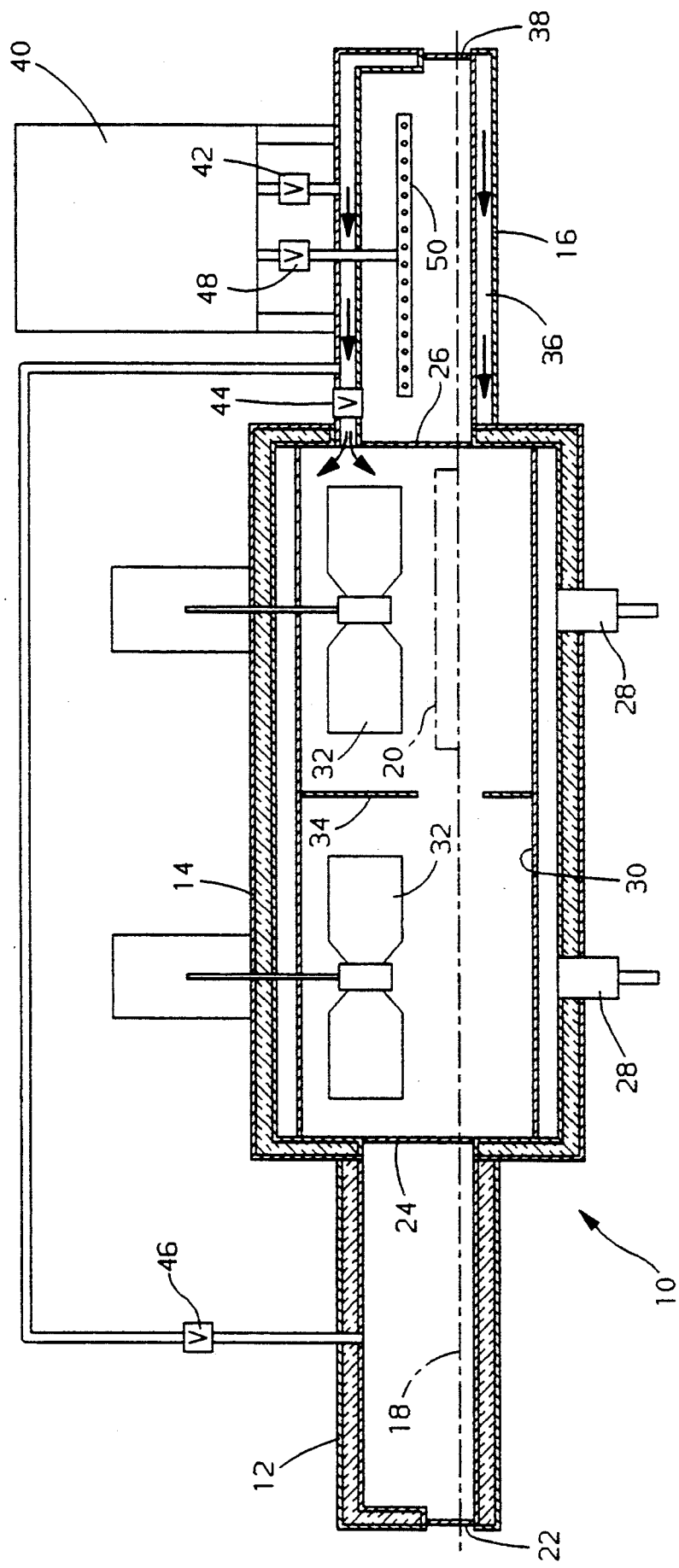
FIG. 3 shows the parts advanced farther in the braze chamber.
Figure 4:
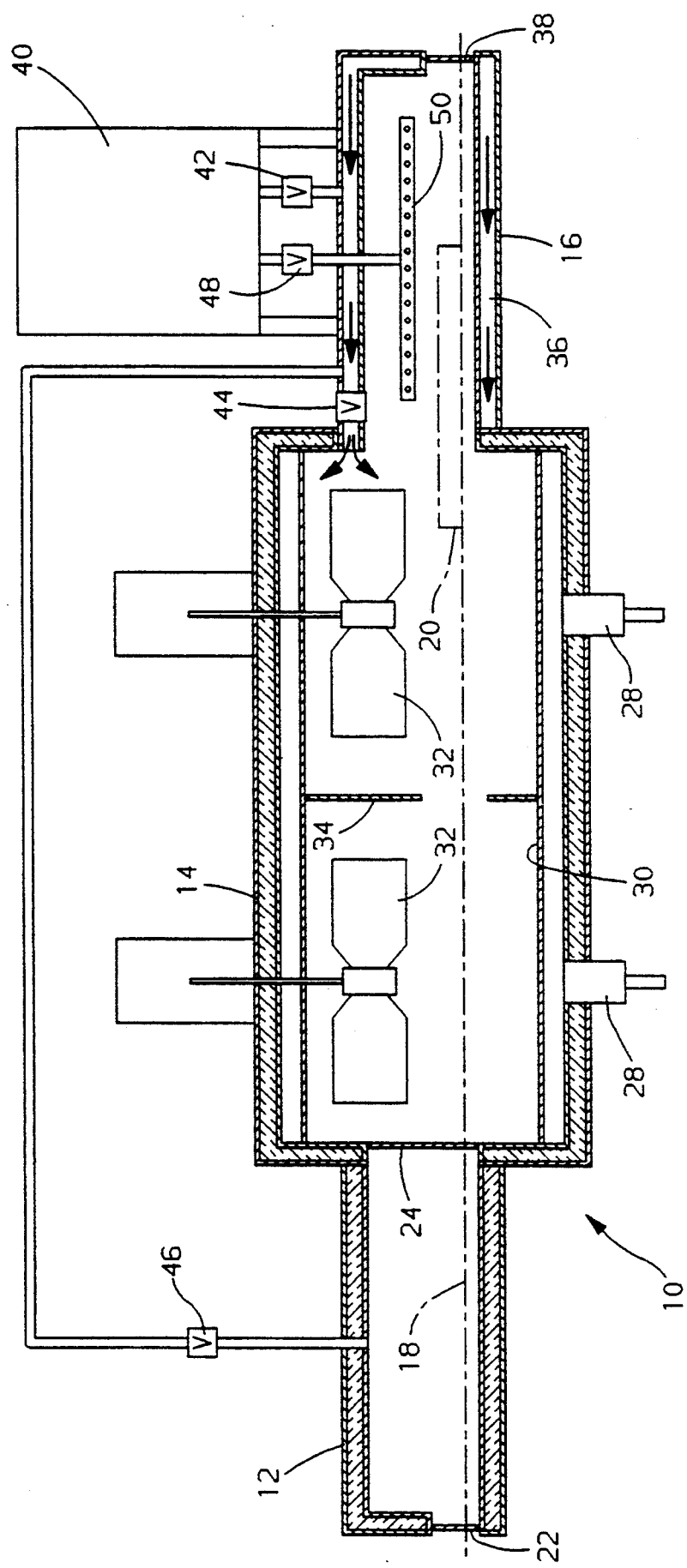
FIG. 4 shows the parts moved into the cooling chamber.
Figure 5:
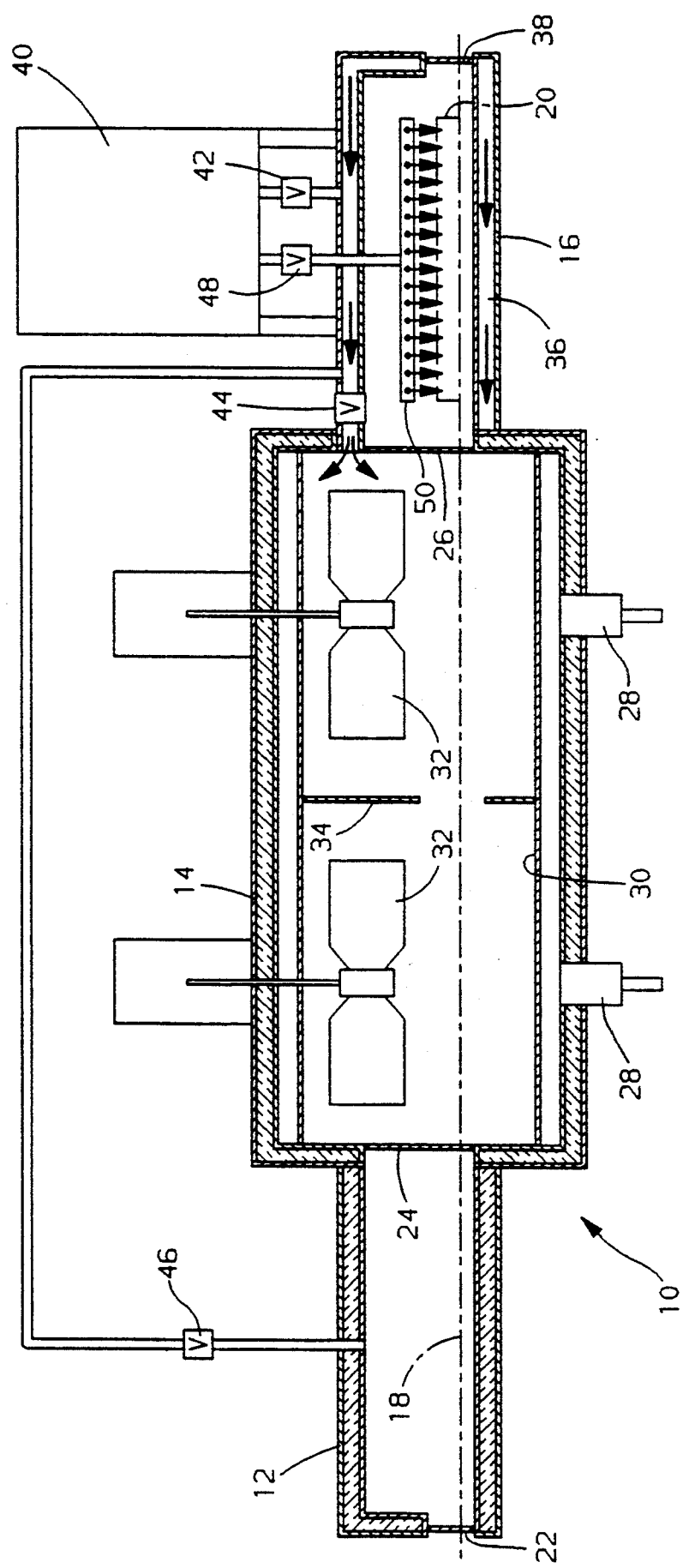
FIG. 5 shows the parts being actively cooled.

Referring next to all of the Figures in order, the various steps in the brazing process are illustrated. Initially, as seen in FIG. 1, a batch of workpieces (20) are received through open door (22) into entrance chamber (12) while door (24) is closed. Outside atmosphere is thereby prevented from entering braze chamber (14) directly. To further prevent oxygen contamination, valve (46) is opened and nitrogen gas is injected into entrance chamber (12), as shown by the arrows, to purge outside air. And, as noted above, valve (44) continually meters nitrogen from plenum (36) into braze chamber (14). Next, as shown in FIG. 2, door (22) is closed and door (24) is opened to admit the batch of workpieces (20) from the purged entrance chamber (12) into braze chamber (14). From there, as seen in FIG. 3, the workpieces (20) advance through the braze chamber (14) on conveyor (18). By the time they traverse braze chamber (14), the workpieces (20) have reached the braze melt point, and are ready to be cooled and solidified. As seen in FIG. 4, door (26) opens, while door (38) remains closed, to admit the heated workpieces (20) to cooling chamber (16). As seen in FIG. 5, when door (26) closes again, the heated workpieces (20) are completely contained, and emit a great deal of heat to the walls of plenum (36), which are, in turn, cooled by the vaporized nitrogen being metered in by valve (42). The temperature in cooling chamber (16) would be continually monitored, and valve (42) regulated, to keep that temperature at the proper level for an ideal cooling rate. To accelerate the cooling rate of the workpieces (20), and to provide a purging flow of nitrogen to cooling chamber (16), liquid nitrogen can be injected directly in a fine spray, through valve (48) and pipe (50), directly above the workpieces (20). This is another "free" benefit of the stored source of liquid nitrogen (40). After the cooled workpieces (20) are withdrawn through door (38), more nitrogen can be injected to keep cooling chamber (16) oxygen free.

In conclusion, the dual requirements of workpiece cooling and inert gas vaporization are used together in a way not done before to reduce costs and simplify the process. Another means could be used to provide purging gas to the cooling chamber (36), such as indirectly injecting vaporized gas from plenum (38), if desired, especially if the very rapid cooling potential of the pipe (50) were not needed. Therefore, it will be understood that it is not intended to limit the invention just to the disclosed embodiment.

The embodiments of the invention in which an exclusive right or privilege is claimed are defined as follows:

1. A braze furnace for brazing workpieces in a controlled inert gas environment of the type having an aligned series of chambers, comprising,
   a braze chamber within which workpieces are received and heated to a suitable brazing temperature,
   a final cooling chamber within which heated workpieces are received from said braze chamber having walls providing a hollow plenum that is heated by heat emitted from said workpieces to a temperature above the vaporization temperature of said inert gas,
   a stored source of inert gas stored in cooled liquid form,
   first valve means to meter liquid inert gas from said stored source into said plenum to vaporize it to gaseous form and to cool said cooling chamber, and,
   second valve means to meter inert gas in vaporized form from said plenum into said braze chamber,
   whereby, heated workpieces are cooled by said inert gas at the same time that liquid inert gas is vaporized by said heated workpieces.

2. A braze furnace for brazing workpieces in a controlled inert gas environment of the type having an aligned series of chambers, comprising,
   an entrance chamber within which workpieces are received initially from the outside atmosphere,
   an intermediate braze chamber within which workpieces are received from said entrance chamber and heated to a suitable brazing temperature,
   a final cooling chamber within which heated workpieces are received from said braze chamber having walls providing a hollow plenum that is heated by heat emitted from said workpieces to a temperature above the vaporization temperature of said inert gas,
   a stored source of inert gas stored in cooled liquid form,
   first valve means to meter liquid inert gas from said stored source into said plenum to vaporize it to gaseous form and to cool said cooling chamber,
   second valve means to meter inert gas in vaporized form from said plenum into said braze chamber, and,
   third valve means to meter vaporized inert gas from said plenum to said entrance chamber to purge ambient atmosphere therefrom as workpieces are received from the outside,
   whereby, said workpieces and stored liquid inert gas source cooperate to both cool said cooling chamber and provide a source of inert vaporized brazing and purging gas.

3. A braze furnace for brazing workpieces in a controlled inert gas environment of the type having an aligned series of chambers, comprising,
   an entrance chamber within which workpieces are received initially from the outside atmosphere,
   an intermediate braze chamber within which workpieces are received from said entrance chamber and heated to a suitable brazing temperature,
   a final cooling chamber within which heated workpieces are received from said braze chamber having walls providing a hollow plenum that is heated by heat emitted from said workpieces to a temperature above the vaporization temperature of said inert gas,
   a stored source of inert gas stored in cooled liquid form,
   first valve means to meter liquid inert gas from said stored source into said plenum to vaporize it to gaseous form and to cool said cooling chamber,
   second valve means to meter vaporized inert gas continually from said plenum into said braze chamber, and,
   third valve means to meter vaporized inert gas from said plenum to said entrance chamber to purge ambient atmosphere therefrom as workpieces are received from the outside,
   fourth valve means to meter a portion of said stored liquid inert gas directly into said cooling chamber to directly cool said heated workpieces, whereby, said workpieces and stored liquid inert gas source cooperate to both cool said cooling chamber and provide a source of inert vaporized brazing and purging gas.

* * * * *